(12) United States Patent
Yochai

(10) Patent No.: US 12,411,828 B2
(45) Date of Patent: Sep. 9, 2025

(54) LSM HYBRID COMPACTION

(71) Applicant: Redis Ltd, Tel-Aviv (IL)

(72) Inventor: Yechiel Yochai, Kohav Yair (IL)

(73) Assignee: Redis Ltd., Tel-Aviv (IL)

( * ) Notice: Subject to any disclaimer, the term of this patent is extended or adjusted under 35 U.S.C. 154(b) by 0 days.

(21) Appl. No.: 18/566,625

(22) PCT Filed: Jun. 1, 2022

(86) PCT No.: PCT/IB2022/055148
§ 371 (c)(1),
(2) Date: Dec. 1, 2023

(87) PCT Pub. No.: WO2022/254368
PCT Pub. Date: Dec. 8, 2022

(65) Prior Publication Data
US 2024/0256511 A1 Aug. 1, 2024

Related U.S. Application Data

(60) Provisional application No. 63/202,223, filed on Jun. 1, 2021, provisional application No. 63/202,224, filed on Jun. 1, 2021.

(51) Int. Cl.
*G06F 7/00* (2006.01)
*G06F 16/215* (2019.01)
*G06F 16/22* (2019.01)
*G06F 16/2457* (2019.01)

(52) U.S. Cl.
CPC ........ *G06F 16/2246* (2019.01); *G06F 16/215* (2019.01); *G06F 16/24573* (2019.01)

(58) Field of Classification Search
CPC ............... G06F 16/2246; G06F 16/215; G06F 16/24573
USPC ....... 707/736, 755, 769, 797, 822, 609, 610, 707/694, 741, 803, 809
See application file for complete search history.

(56) References Cited

U.S. PATENT DOCUMENTS

| | | |
|---|---|---|
| 2018/0225321 A1 | 8/2018 | Boles et al. |
| 2018/0349095 A1 | 12/2018 | Wu et al. |
| 2019/0004768 A1 | 1/2019 | Li et al. |
| 2020/0183905 A1* | 6/2020 | Wang ................. G06F 16/2246 |
| 2020/0257669 A1 | 8/2020 | Boles et al. |
| 2021/0382863 A1* | 12/2021 | Munipalle ........... G06F 16/2246 |
| 2022/0156231 A1* | 5/2022 | Wang ................. G06F 16/9027 |

FOREIGN PATENT DOCUMENTS

EP  3422215 A1 *  1/2019  ......... G06F 16/2246

OTHER PUBLICATIONS

"Dostoevsky: Better Space-Time Trade-Offs for LSM-Tree Based Key-Value Stores via Adaptive Removal of Superfluous Merging" Niv Dyana, Stratos Idreos, Harvard University 16 pages.

* cited by examiner

*Primary Examiner* — Md I Uddin

(57) ABSTRACT

A method for log-structured merge (LSM) tree compaction, the method includes (i) performing partial compaction processes. Each partial compaction process is associated with a target layer. Different partial compaction processes that are associated with a same target layer are allocated to different non-overlapping key ranges of the target layer. Some of the partial compaction processes are associated with a target layer that is a last layer of the LSM tree.

19 Claims, 9 Drawing Sheets

Performing partial compaction processes. Each partial compaction process may be associated with a target layer. The LSM tree may have multiple layers and a partial compaction process may be associated with a target layer that may be any target layer of the LSM tree. 110

Dynamically creating and at least partially deleting the plurality of sorted runs per layer during the partial compaction processes. 111

Maintaining an integrity of files. 112

Allocating first storage resources for storing a current version of the last layer, and allocating second storage resources for storing a compacted version of a currently compacted part of the last layer, wherein a size of the second storage resources does not exceed a size of the second storage resources. 113

Dynamically changing the non-overlapping key ranges associated with one or more partial compaction process. 114

Determining one or more non-overlapping key ranges to be associated with the partial compaction process. 115

Delaying a partial compaction process related to a target layer until the source layer includes complete sorted runs, wherein a complete sorted run may include files that store keys from all key ranges of the last layer. 116

Determining one or more parameters of a partial compaction process associated with a certain LSM layer independently from a determining of one or more parameters of a partial compaction process associated with another LSM layer. 117

LSM HYBRID COMPACTION

CROSS-REFERENCE

This application claims priority from U.S. provisional patent application No. 63/202,223 filing date Jun. 1, 2021 and from U.S. provisional patent application No. 63/202,224 filing date Jun. 1, 2021—both being incorporated herein by reference.

BACKGROUND

In computer science, the log-structured merge-tree (or LSM tree) is a data structure with performance characteristics that make it attractive for providing indexed access to files with high insert volume, such as transactional log data. LSM trees, like other search trees, maintain key-value pairs. LSM trees maintain data in two or more separate structures, each of which is optimized for its respective underlying storage medium; data is synchronized between the two structures efficiently, in batches. (WWW.WIKIPEDIA.org).

One simple version of the LSM tree is a two-level LSM tree. As described by Patrick O'Neil, a two-level LSM tree comprises two tree-like structures, called $C_0$ and $C_1$. $C_0$ is smaller and entirely resident in memory, whereas $C_1$ is resident on disk. New records are inserted into the memory-resident $C_0$ component. If the insertion causes the $C_0$ component to exceed a certain size threshold, a contiguous segment of entries is removed from $C_0$ and merged into $C_1$ on disk. The performance characteristics of LSM trees stem from the fact that each component is tuned to the characteristics of its underlying storage medium, and that data is efficiently migrated across media in rolling batches, using an algorithm reminiscent of merge sort.

Most LSM trees used in practice employ multiple levels. Level 0 includes multiple L0 sorted runs. The on-disk data is organized into sorted runs of data. Each run contains data sorted by the index key. A run can be represented on disk as a single file, or alternatively as a collection of files with non-overlapping key ranges sorted by the key. To perform a query on a particular key to get its associated value, one must search in the Level 0 tree and each run.

A particular key may appear in several runs. A key that appears in a higher level overrides (means that the key value pair of the higher level represents the most updated version of the key value pair) a key that appears in a lower level.

In order to keep down the cost of queries, the system must avoid a situation where there are too many runs.

Extensions to the 'leveled' method to incorporate B+ tree structures have been suggested, for example bLSM and Diff-Index.

LSM trees are used in data stores such as Bigtable, HBase, LevelDB, SQLite4, Tarantool, RocksDB, WiredTiger, Apache Cassandra, InfluxDB[8] and ScyllaD A known drawback of compaction is that most of the data is sitting in the last levels, when the last hyper-level is compacted almost all the database needs to be rewritten. The last layer of the LSM tree is the largest layer of the LSM tree and is much larger that all previous layers. In order to support compaction, a storage space of at least twice the size of the last layer must be maintained—one part of the storage space is for current version of the last layer and the other part is for storing a currently compacted last layer.

This process can take a long time on a large database and consumes plenty of space. Note that a similar process is defined in the LevelDb implementation and named "major compaction".

LSM is very effective when relatively small objects are written to memory. In LSM, randomly written small objects are accumulated in the server DRAM. Eventually these objects are sorted and flushed to a storage (AKA flush). The storage may also decide to merge sorted containers together to create a larger container and to remove duplicate values (AKA compaction).

LSM-based technology in general replaces random writes to the media with few sequential writes. When comparing the performance of writes, the common term is "write amplification" or else the number of bytes the system needs to write for every byte that the user writes.

There is a growing need to provide a solution that is also fit to scenarios that differ from random writing of small objects.

SUMMARY

There may be provided a method, system and non-transitory computer readable medium for LSM compaction.

There may be provided a method, system and non-transitory computer readable medium for a hybrid merge tree.

BRIEF DESCRIPTION OF THE DRAWINGS

The embodiments of the disclosure will be understood and appreciated more fully from the following detailed description, taken in conjunction with the drawings in which:

FIG. 7 illustrates an example of a method;

DESCRIPTION OF EXAMPLE EMBODIMENTS

Figure 1:
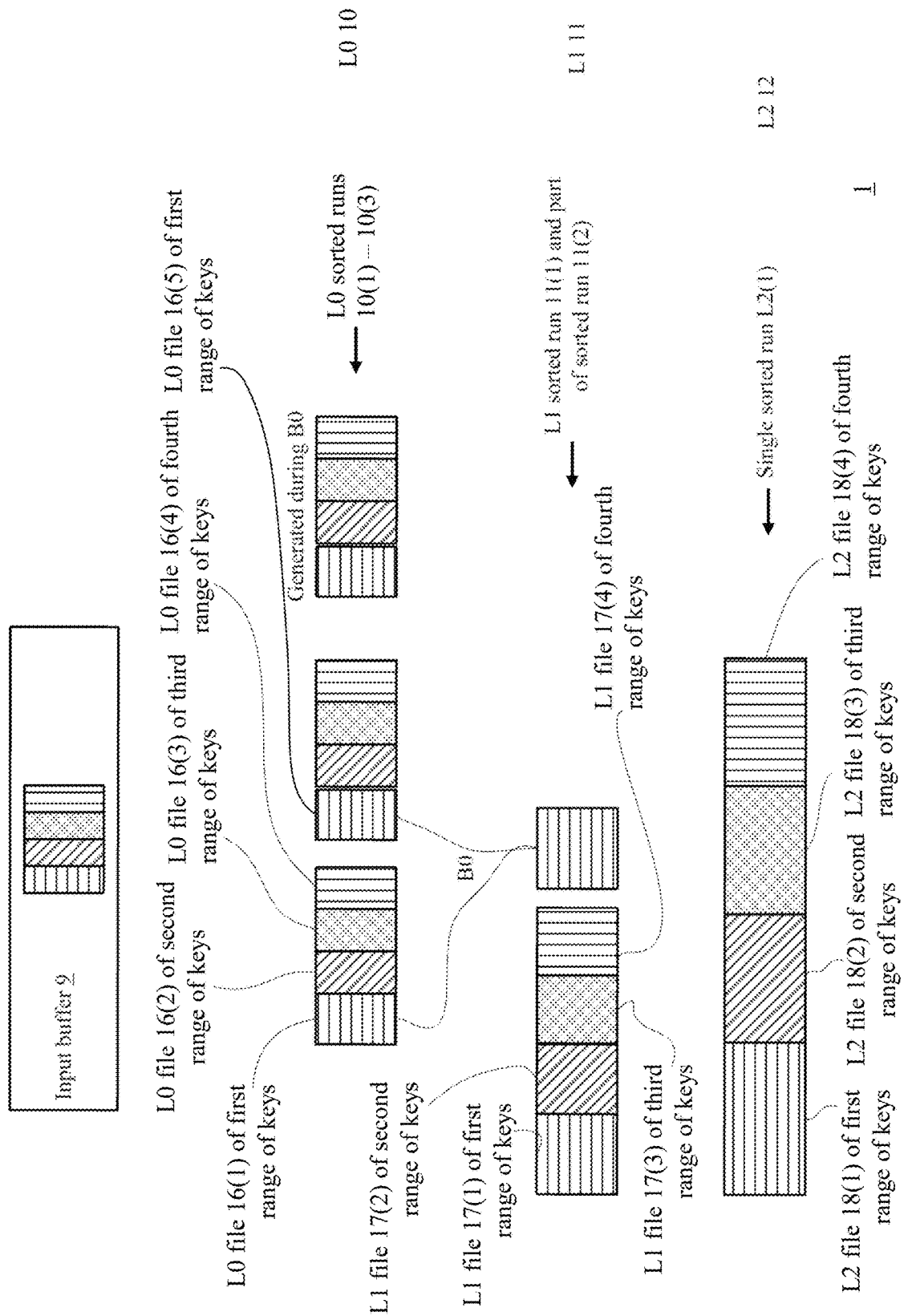
FIG. 1 illustrates an example of a partial compaction process.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

LSM Compaction

LSM contains several sorted runs. A sorted run is a sorted list of keys and values. There is an order relationship between the sorted runs, which define the order of search (the search starts with the smallest sorted run and continues to the next until the key is found).

Each sorted run is divided into containers (files). Compaction is a process that takes a few files and merges them together to create other files in a higher level. Since the same key may appear in different levels, the first concern is to select a consistent set of files. The consistency means that keys that appear in a few levels between the first input level and the output level (including) should be either completely out or completely in.

In level structure all the levels except Level-0 contains a single sorted run.

In leveled-n compaction, some levels may contain more than one sorted-run; to avoid confusion the term hyper-level is used to define this structure. A hyper-level is a level that include multiple sorted runs.

The last level/hyper-level contains a single level.

When compaction is running on the last hyper level almost the entire database needs to be rewritten. Since the compaction needs to save the output before releasing the input this means that the system needs to preserve space that is doubled.

There is provided a way to do partial compaction without breaking the consistency rules. This breakdown will offer a much better performance both in terms of write amplification and in terms of space amplification.

Each sorted run may be divided into sorted files. The files are sorted by a key, meaning all the keys in a specific file are smaller than any of the keys in the next file. Each file metadata holds a pair of [smallest-key, largest-key].

A compaction process may take all the files in all the sorted runs between the first input level and the target level, merge them together and create a new sorted run in the target level.

The compaction of each hyper level may be broken into several "partial compaction".

The partial compaction will be done consecutively, each one will be picking a range of data from the last input level that belongs to the hyper level, and perform a compact on this range.

When a partial compaction is ended the range will be cleared.

The partial compaction will be performed until the entire range of the last sorted run will be covered and the sorted run may be deleted.

For each partial compaction we have two parts that are related.

Selection of the range.

Break down the output file on "good points" to reduce the write amplification of the next compaction.

Terms

Sorted run/level—a sorted container of key and values. The sorted run is broken into files.

Hyper level—a list of sorted runs.

Target level—the compaction target level. All the partial compactions of a single compaction share the same target level. The target level is usually a level in the next hyper level expect in the last hyper level.

Inputs levels—the levels that are used as input to the compaction process. All the input levels of the compaction belong to the same hyper level.

Last input level, the last level in the hyper level

Partial compaction—a process that takes a range of data from one or more levels of the hyper and merge it together into the target level Full compaction—a process consisting of one or more partial compactions. The process ends when the last input level is empty.

Lower/upper bound—two keys that define the boundaries of the compaction for lower levels. All the files that are selected in the lower levels must be within the bound.

Breaking Down the Compaction to Partial Compaction

The compaction process may include a few partial compactions, each partial compaction is doing compaction of a range of data and each starting at the location where the previous partial compaction ended. At any given time, there may be only one partial compaction running per hyper level.

The breakdown can be done on the file boundaries of the last input level. Each partial compaction is taking one or more files from the last input level. Eventually when the last file from the last input level is selected the compaction process ends. As a result, the last input level would become empty (and deleted), and the new compaction may start over using the new input levels.

Input Selection for a Partial Compaction

Correct input selection for the partial compaction may be beneficial

The input selection can be done with two targets:

Size of compaction should be within a given limits.

Reduction of the write amplification.

The selection may include:

Dividing the sorted run into files and the number of files is relatively small (for example between 1-10, or 1-10, or 1-50 or 1-100, or 1-150, and the like).

The compaction is working in a unit of a file, and a file is either fully compacted or not at all.

Files that intersect with files that were selected on lower levels must be selected as well.

The file selection algorithm starts from the last input level; the selection may include selecting a few files from this level and defining the compaction boundaries.

Once this step is done the selection is adding files from all the levels of the hyper-level. In each level, we may need to update the boundaries of the compaction.

The process is divided into two major parts:

Range and boundary selection.

Expand the selection to include more files from lower level

Range and Boundary Selection

The process of defining the initial boundaries is:

Init:
Select the first file from the last input level.
Set init compaction range (a range between the smallest key of the file and largest key of the file) based on this file.
Get a list of files in the target level that intersect with this file. Two files intersect when they include keys that fall within the init compaction range.
Set lower boundary as the largest of
  i. Largest key of the last file in the target level that is smaller than the range.
  ii. Previous compaction largest key.

Loop—for selecting which key range will be used in a partial compaction process from layer of the LSM tree to another layer of the LSM tree.
  Calculate estimated write-amp.
    i. Size of target files/(size of input files).
  If (size of input files)>threshold.
  Exit from loop—and do not add a file.
  Try to add the next file from the input.
    i. Add files from the target level containing keys until the end of the new files
    ii. Calculate new estimated write amplification
    iii. If new estimated write amplification is higher
  1. Exit from loop without adding the file Finish:
Set upper boundary as the smallest between
  i. Smallest key of the first file in the target level that was not picked
  ii. Smallest key in the file of the input level that was not selected.
Set compaction range smallest and largest The output of this procedure is:
List of files from the last input level (should not be empty)
List of files from the target level (may be empty).
Smallest and largest key.
Upper and lower boundaries Expanding the Selection The process is aimed to select files from the other input levels, that contain the keys between the smallest and largest keys, without breaking the conditions.

The process is:
Setup the first input level
  i. The first level in the hyper that has data and it is after the target of the previous hyper level compaction.
For each level between the last input level and the first input level:
  i. Find the first file that all the keys are larger than the boundary Smallest key in the file>lower boundary.
  ii. Find the first file that hold keys in the range of compaction.
  iii. Take all the files until that hold keys within the range until we cross the upper boundary–largest (file)>=upper boundary
  iv. Update the boundaries if needed.

The outcome of the two steps is a set of files that are used as an input to the compaction process.

Breaking down the compaction output files.

As explained above each of the sorted runs is divided into one or more files. The current compaction breaks the compaction output based on a parameter target file size. Hence it is easy to see that in many cases we cannot add to the compaction files in the edge of the compaction, and we must add files in the output level that are partially intersect with the compaction range. This problem becomes worse the more levels we have as files that are excluded in level N cause also the boundaries to shrink.

The solution is a "break by key", the compaction of all the hyper levels will try to break down on the same sets of keys. In order to do this the compaction process gets a sorted list of keys which are the smallest key of each file in the last level. The process is:

Init (key)
  i. Set current breakpoint to be the first key larger than the input key
Should break here (key)
  i. If current breakpoint>key then—return false
  ii. Else—set current breakpoint to be the first key larger than the input key, and
Return true.

The result is that all the levels contain the same number of files, and all the files that contain keys in a range defined by the close range of [smallest . . . largest] of one target file will be fully included in the open range that is defined for the compaction (lower-boundary . . . upper-boundary).

FIG. 1-5 illustrates different partial compaction processes in an LSM tree 1 that include three layers—L0 10, L1 11 and last layer L2 12. FIGS. 1-5 also illustrate input buffer 9. There may be any number of layers—for example more than three.

Each sorted run—when full—includes files of four non-overlapping key ranges. The last layer has only one sorted run. The other layers may be initialized with one or no sorted run but in steady state have multiple sorted runs per layer.

FIG. 1-4 illustrates the dynamic formation of sorted runs of layer L0 and the dynamic partial deletion and even full deletion of the sorted runs of layer L0. The same applies to any other layer (such as layer L1) that is not the last layer. The last layer may start empty and over time includes a single sorted run that may be updated using partial compaction processes.

For simplicity of explanation—(a) files that include KVPs with keys within a first range of keys (referred to as first files) are illustrated with boxes of a pattern made of horizontal lines—see first files 16(1) of L0, 17(1) of L1 and 18(1) of L2, (b) files that include KVPs with keys within a second range of keys (referred to as second files) are illustrated with boxes of a pattern made of diagonally oriented lines-see second files 16(2) of L0, 17(2) of L1 and 18(2) of L2, (c) files that include KVPs with keys within a third range of keys (referred to as third files) are illustrated with boxes of a pattern made of dots-see third files 16(3) of L0, 17(3) of L1 and 18(3) of L2, and (d) files that include KVPs with keys within a forth range of keys (referred to as forth files) are illustrated with boxes of a pattern made of vertical lines—see forth files 16(4) of L0, 17(4) of L1 and 18(4) of L2.

FIG. 1 illustrates a first partial compaction process (denoted B0) that starts when the first layer L0 10 includes two sorted runs 10(1) and 10(2), second layer L1 includes sorted run 11(1) and the last layer L2 includes sorted run 12(1).

During B0, the first files 16(1) and 16(5) of runs 10(1) and 10(2) are merged to a new first file of a sorted run 11(2) of L1—and a new sorted run 10(3) of L0 is formed (referred to as "generated during B0"). At the end of B0 these first files are deleted (see "x" in FIG. 2) to provide partially deleted sorted runs 10(1) and 10(2) in FIG. 2.

Figure 2:
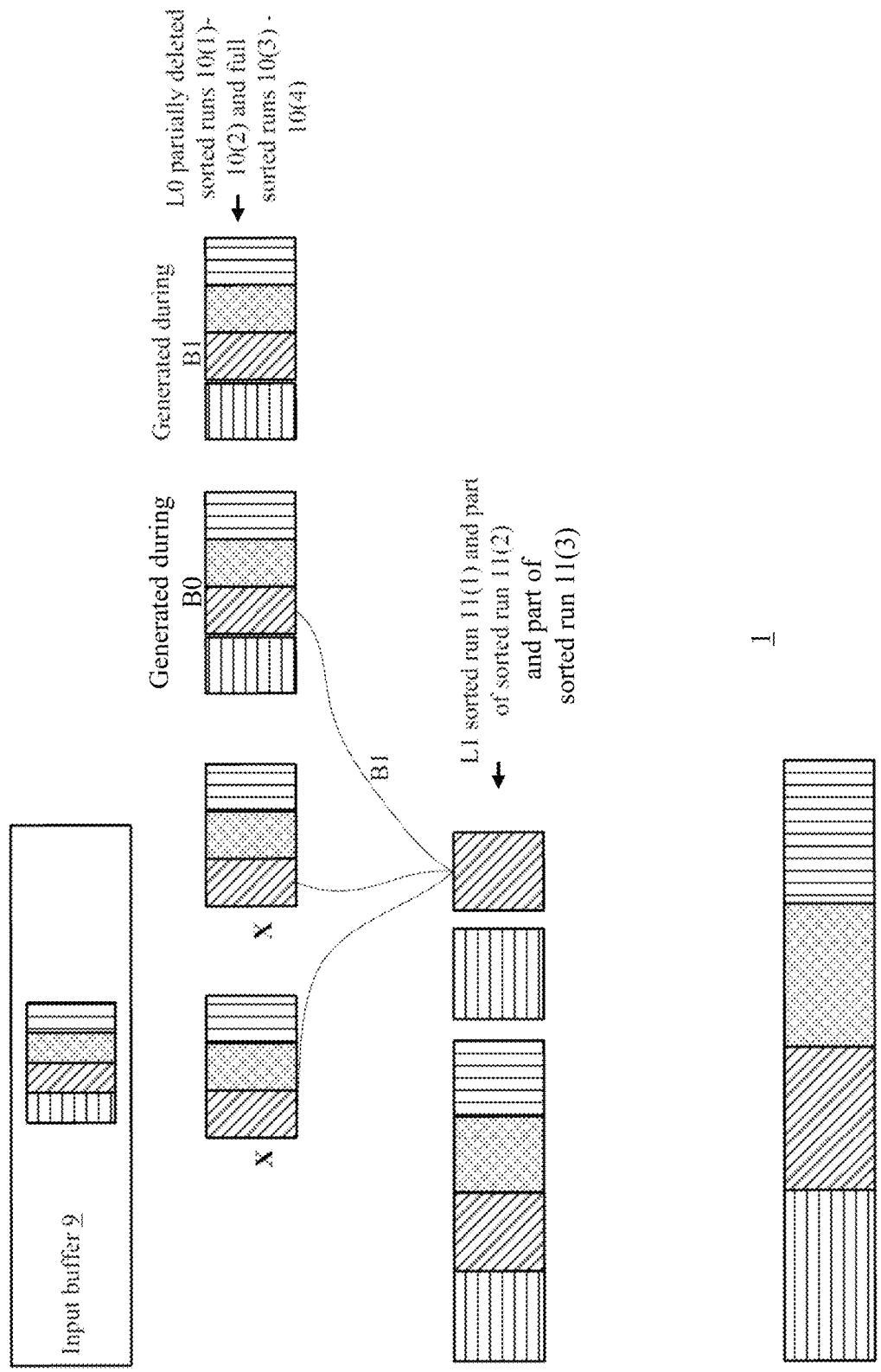
FIG. 2 illustrates an example of a partial compaction process.

FIG. 2 illustrates a second partial compaction process (denoted B1). During B1, the second files of runs 10(1), 10(2) and 10(3) are merged to a new second file of a sorted run 11(2) of L1—and a new sorted run 10(4) of L0 is formed (referred to as "generated during B1"). At the end of B1 these second files are deleted (see "x" and "xx" in FIG. 3) to provide partially deleted sorted runs 10(1), 10(2) and 10(3).

Figure 3:
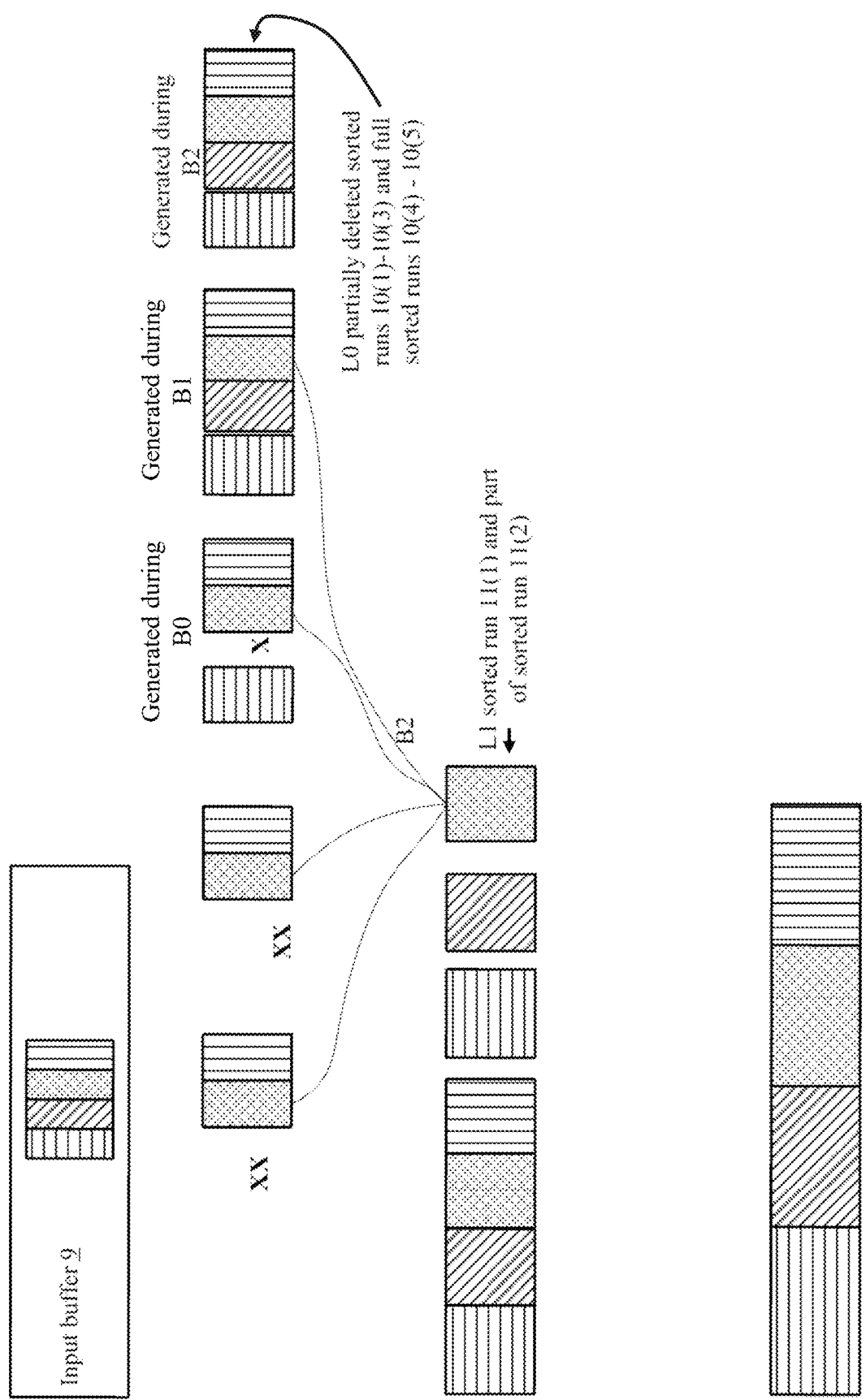
FIG. 3 illustrates an example of a partial compaction process.

FIG. 3 illustrates a third partial compaction process (denoted B2). During B2, the third files of runs 10(1), 10(2), 10(3) and 10(4) are merged to a new third file of a sorted run 11(2) of L1—and a new sorted run 10(5) of L0 is formed (referred to as "generated during B2"). At the end of B2 these third files are deleted (see "xxx" and "xx" and "x" in FIG. 4) to provide partially deleted sorted runs 10(1), 10(2), 10(3) and 10(4).

Figure 4:
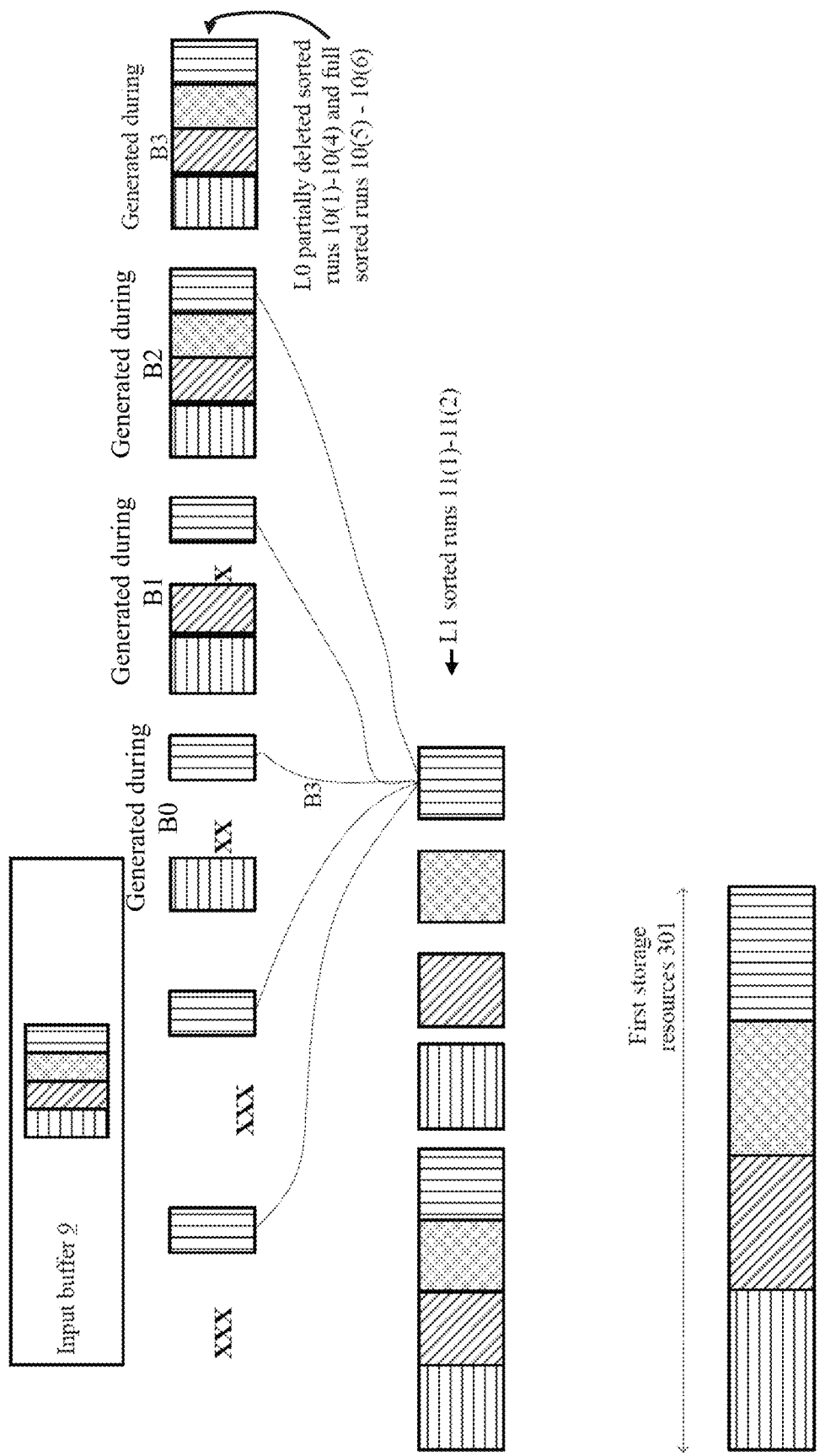
FIG. 4 illustrates an example of a partial compaction process.

FIG. 4 illustrates a forth partial compaction process (denoted B3). During B3, the fourth files of runs 10(1), 10(2), 10(3), 10(4) and 10(5) are merged to a new forth file of a sorted run 11(2) of L1—and a new sorted run 10(6) of L0 is formed (referred to as "generated during B3"). At the end of B3 these fourth files are deleted (see "xxx" and "xx" and "x" in FIG. 5) to provide partially deleted sorted runs 10(3), 10(4) and 10(5). Sorted runs 10(1) and 10(2) are deleted.

Figure 5:
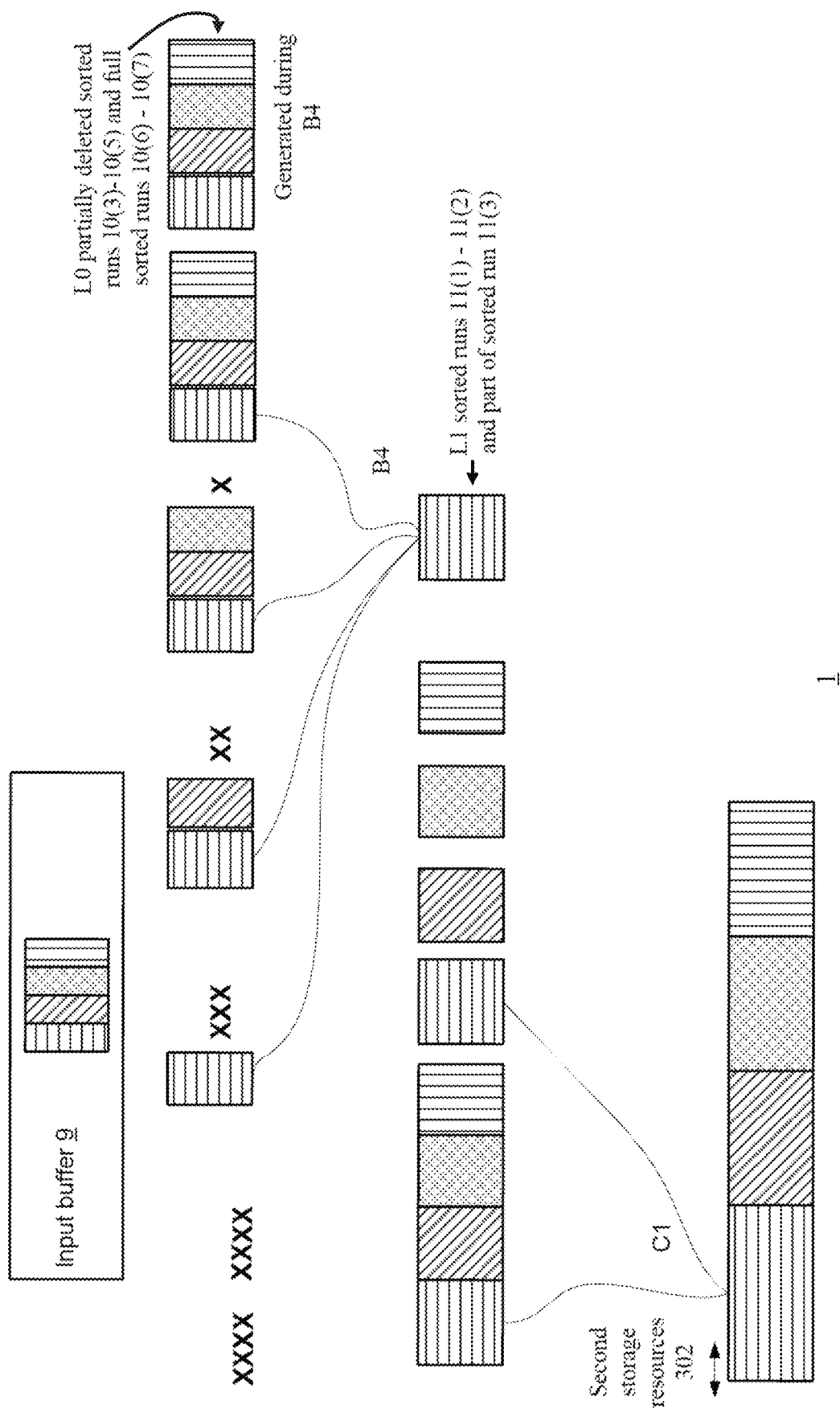
FIG. 5 illustrates an example of a partial compaction process.

FIG. 5 illustrates a fifth partial compaction process (denoted B4). During B4, the first files of runs 10(3), 10(4), 10(5) and 10(6) are merged to a new forth file of a sorted run 11(3) of L1—and a new sorted run 10(7) of L0 is formed (referred to as "generated during B4"). At the end of B4 these first files are deleted.

FIG. 5 also illustrates a sixth partial compaction process—in which first files of L1 and a previous version of a first file of L2 are merged to provide an updated first file of L2. This is denoted C1. After the completion of C1—the two first files of L1 are deleted.

It may be beneficial that each file includes KVPs that have keys within key ranges that do not exceed the key ranges used in the last layer. The different non-overlapping key ranges that may also define partitions of each layer. Each sorted run of each layer (except the last layer) may be portioned to files according to the key ranges used in the last layer.

Figure 6:
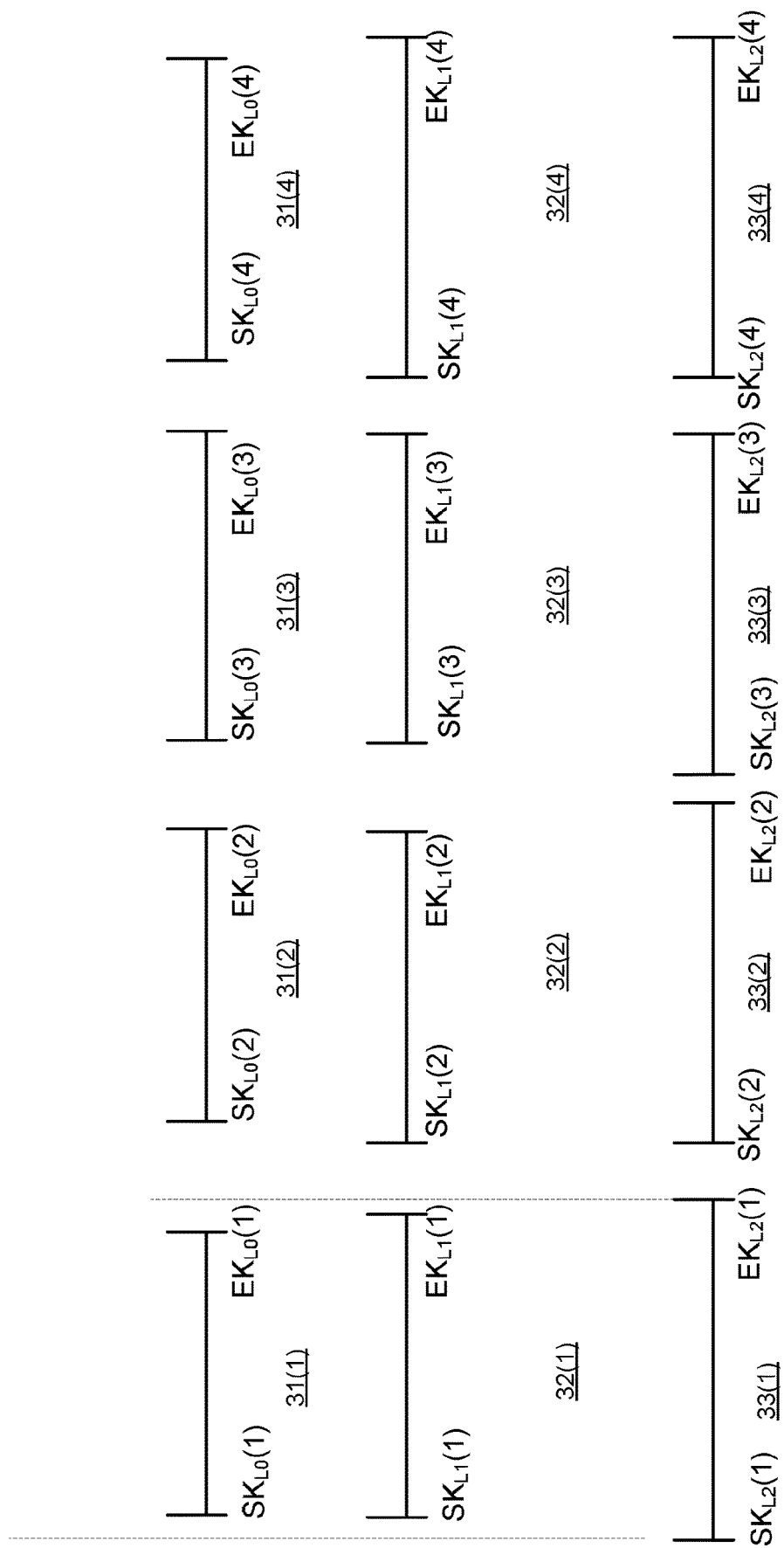
FIG. 6 illustrates an example of a key ranges.

FIG. 6 illustrates examples of key ranges:

First files of L0 have KVPs that have keys that belong to first L0 key range (each range is delimited by start key (SK) and ends an end key (EK)) that ranges between $SK_{L0}(1)$-$EK_{L0}(1)$.

Second files of L0 have KVPs that have keys that belong to second L0 key range that ranges between $SK_{L0}(2)$-$EK_{L0}(2)$.

Third files of L0 have KVPs that have keys that belong to third L0 key range that ranges between $SK_{L0}(3)$-$EK_{L0}(3)$.

Forth files of L0 have KVPs that have keys that belong to forth L0 key range that ranges between $SK_{L0}(4)$-$EK_{L0}(4)$.

First files of L1 have KVPs that have keys that belong to first L1 key range that ranges between $SK_{L1}(1)$-$EK_{L1}(1)$.

Second files of L1 have KVPs that have keys that belong to second L1 key range that ranges between $SK_{L1}(2)$-$EK_{L1}(2)$.

Third files of L1 have KVPs that have keys that belong to third L1 key range that ranges between $SK_{L1}(3)$-$EK_{L1}(3)$.

Forth files of L1 have KVPs that have keys that belong to forth L1 key range that ranges between $SK_{L1}(4)$-$EK_{L1}(4)$.

First files of L2 have KVPs that have keys that belong to first L2 key range that ranges between $SK_{L2}(1)$-$EK_{L2}(1)$.

Second files of L2 have KVPs that have keys that belong to second L2 key range that ranges between $SK_{L2}(2)$-$EK_{L2}(2)$.

Third files of L2 have KVPs that have keys that belong to third L2 key range that ranges between $SK_{L2}(3)$-$EK_{L2}(3)$.

Forth files of L2 have KVPs that have keys that belong to forth L2 key range that ranges between $SK_{L2}(4)$-$EK_{L2}(4)$.

FIG. 7 illustrates an example of method 100 for log-structured merge (LSM) tree compaction.

Method 100 may include step 110 of performing partial compaction processes. Each partial compaction process may be associated with a target layer. The LSM tree may have multiple layers and a partial compaction process may be associated with a target layer that may be any target layer of the LSM tree.

Different partial compaction processes that are associated with a same target layer are allocated to different non-overlapping key ranges of the target layer. For example—partial compaction processes B0, B1, B2 and B3 have the same target layer (L1) and are associated with different key ranges (first, second, third and fourth key ranges accordingly). There may be multiple repetitions of such partial compaction processes.

Some of the partial compaction processes are associated with a target layer that is the last layer of the LSM tree.

The LSM tree includes multiple layers. Each layer that differs from the last layer may include a plurality of sorted runs. The last layer may include a single sorted run.

Step 110 may be executed multiple times—and multiple partial compaction operations may be executed on any pairs of (source layer, target layer) multiple times. The execution of one or more partial compaction process may be triggered by a reception of files from a previous layer, based on one or more additional conditions (for example waiting for a formation of a new full sorted run at a source layer, and the like).

Step 110 may include step 111 of dynamically creating and at least partially deleting the plurality of sorted runs per layer during the partial compaction processes. Examples of dynamic creation and at least partially deletion (includes partial deletion and full deletion) are illustrate din FIGS. 1-5—especially in relation to layer L0.

A partial compaction process allocated to a certain key range may include merging source layer key value pairs (KVPs) of source layer files that exist at a start point in time of the partial compaction process. For example—B1 may merge second files that existed before the start of B0 and also may merge second files generated during B0.

The some of the source layer files may belong to partially deleted sorted runs. See for example—partial deletion of L0 sorted runs after B0, after B1, and the like. There is also a partial deletion of any sorted run of any layer except the last LSM layer.

Step 110 may include step 112 of maintaining an integrity of files—in the sense that a file is not split to different segments that are merged at different partial compaction processes. An entire file of a source layer of the multiple layers may be subjected to up to a single partial compaction process to a target layer of the multiple layers.

The different non-overlapping key ranges of files of different source layers may be dictated by different non-overlapping key ranges of the last layer of the LSM tree. See, for example, FIG. 6.

Each file of each layer of the LSM tree may store keys that belong to a single key range of the last layer of the LSM tree.

Different partial compaction processes that are associated with the same target layer and are allocated to the different non-overlapping key ranges of the target layer may be executed in a serial manner. Different compaction processes related to different pairs of (source layer, target layer) may be executed in parallel to each other, may executed in a partially overlapping manner or may be executed at different non-overlapping time periods.

Step 110 may be executed without performing full compaction process of full layers.

Step 110 may include step 113 of allocating first storage resources (denoted 301 in FIG. 4) for storing a current version of the last layer, and allocating second storage resources (denoted 302 in FIG. 5) for storing a compacted version of a currently compacted part of the last layer, wherein a size of the second storage resources does not exceed a size of the second storage resources.

The size of the second storage resources may be less than 5, 10, 15, 20, 25, 30, 35, 40, 45, 50, 55, 60, 65, 70, 75, 80, 85, 90, 95, or 99 percent of the size of the first storage resources.

Memory resources may be allocated per each layer of the LSM tree—for the current version of the layer and for a compacted version of a currently compacted part of the layer. The former may exceed the latter.

Any key range of any layer of the LSM tree does not exceed a certain percent of an aggregate key range of the last layer of the LSM tree. The last layer may well exceed any other layers of the LSM tree—for example may exceed by a factor of at least 1.5, 2, 3, 4, 5, 6, 7, 8, 9, 10, 150, 20, 25, 30 and even more.

Step 110 may include step 114 of dynamically changing the non-overlapping key ranges associated with one or more partial compaction process.

Step 110 may include step 115 of determining one or more non-overlapping key ranges to be associated with the partial compaction process.

Step 115 may include determining based on a write amplification associated with the execution of the partial compaction process.

Step 114 may include determining based on (a) a write amplification associated with the execution of the partial compaction process (may require larges key values per sorted run segment), and (b) an impact on the last layer of the LSM tree (maintain smaller last layer portion to be compacted-smaller portions may reduce the overall memory resource consumption).

Step 110 may include step 116 of delaying a partial compaction process related to a target layer until the source layer includes complete sorted runs, wherein a complete sorted run may include files that store keys from all key ranges of the last layer. For example—delaying partial compaction process C1 till the completion of partial compaction process B3.

Step 110 may include step 117 of determining one or more parameters of a partial compaction process associated with a certain LSM layer independently from a determining of one or more parameters of a partial compaction process associated with another LSM layer. The one or more parameters may include the ranges of keys.

Figure 8:
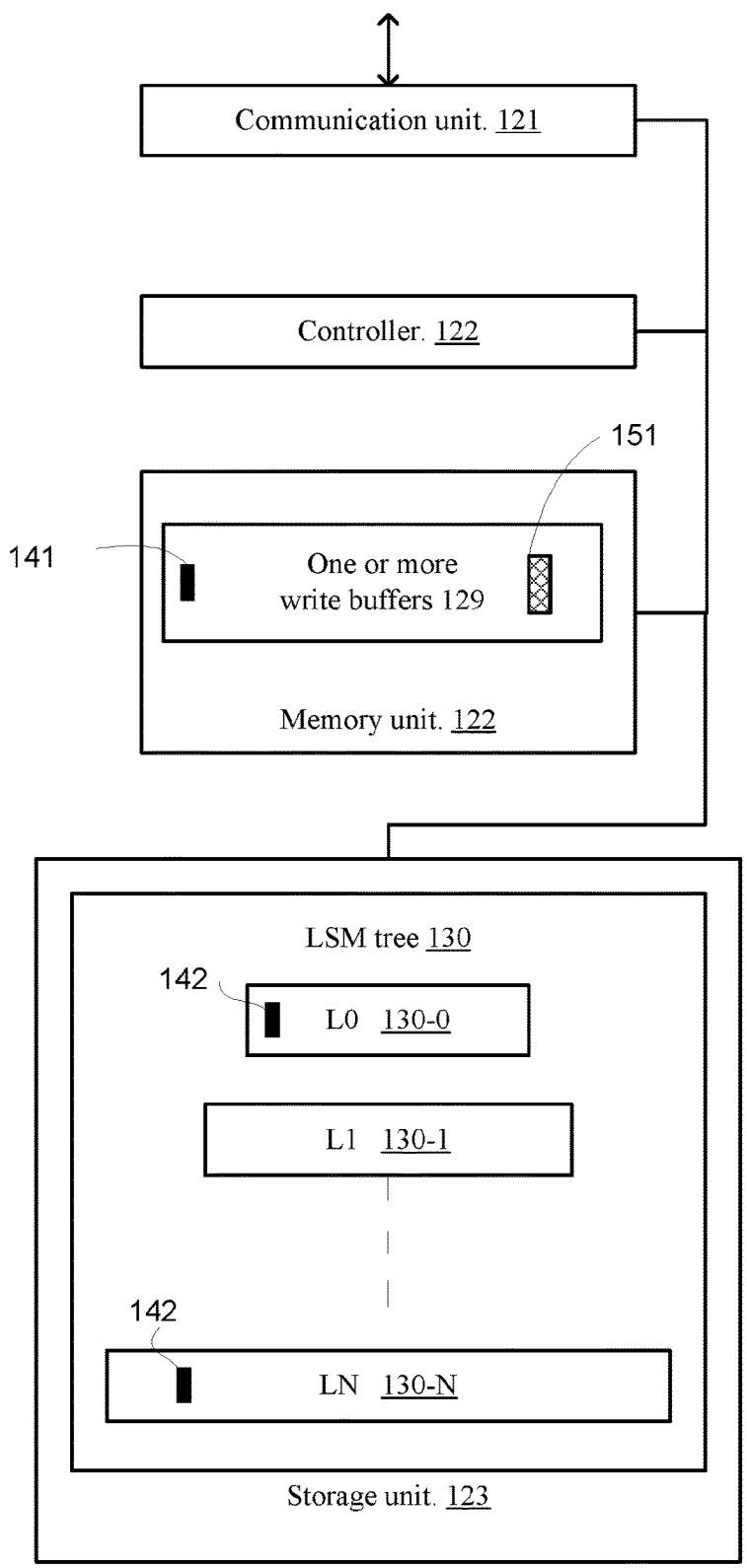
FIG. 8 illustrates an example of a computerized system.
Figure 9:
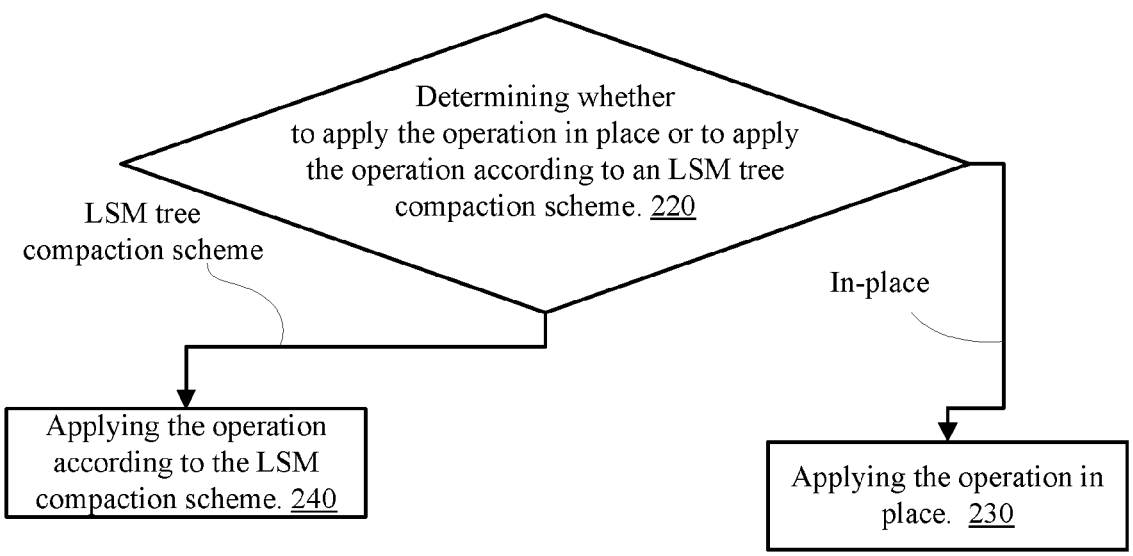
FIG. 9 illustrates an example of a method.

FIG. 8 illustrates an example of a system 120 that is configured to execute method 100 of FIG. 7 and/or method 200 of FIG. 9.

The system 120 may be referred to as a LSM tree compaction system and/or as a hybrid system.

System 120 may include communication unit 121, controller 122, memory unit 122 and storage unit 123.

The communication unit 121 may be in communication with other systems and/or devices and the like. Additionally or alternatively, the communication unit 121 may be in communication with controller 122 and/or memory unit 122 and/or storage unit 123.

Memory unit 122 may be a random access memory unit—or another type of memory unit—and may store one ore more buffers such as write buffers 129.

Storage unit 123 may store an LSM tree 130 that may include (N+1) layers such as L0 130-1, L2 130-1 till LN 130-N. N is an integer than may exceed two. FIG. 8 illustrates a buffered KVP 141 and KVP instances 142 and 143 that are stored in the LSM tree 130.

Controller 122 is configured to perform partial compaction processes. Each partial compaction process may be associated with a target layer. Different partial compaction processes that are associated with a same target layer are allocated to different non-overlapping key ranges of the target layer. Some of the partial compaction processes are associated with a target layer that is a last layer of the LSM tree.

Additionally of alternatively, controller 122 may be configured to (i) receive a request to apply an operation on a KVP, wherein the request is received before storing the KVP in a layer of a log-structured merge (LSM) tree; (ii) determine whether to apply the operation in place or to apply the operation according to an LSM tree compaction scheme; (iii) apply the operation in place when determining to apply the operation in place; and (iv) apply the operation according to an LSM tree compaction scheme when determining to apply the operation according to the LSM tree compaction scheme.

The controller 122 may include one or more processing circuitries. A processing circuitry may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits.

The suggested method provides a highly effective merge of the last hyper level into the last level (the database level)—as the last hyper level includes most of the data of the database and the size of the last hyper level is limited by the user AKA "space-amp" (usually 30-40% of the database size).

i. The LSM virtually uses atomic change of data versions—as a lower level version of data should be maintained until the merge in the target level is successfully completed. Thus—the system must keep additional storage space of a size which is equal to the compaction size. Partial compaction reduces this requirement.

ii. Partial compaction reduces the granularity of steps and allows for adjustable priority and spread of work over time.

iii. The addition of more sorted runs to the partial compaction the method reduces the write amplification and also may increase the size of the inputs without impacting the space amplification.

iv. Defining the kay ranges according to the key ranges of the highest level ensures that partial compaction expansion on all the levels will take the exact same range of keys.

Items iii and iv reduce the write amplification by a factor of near two (with space-amp of 30% the compaction in normal case needs to read and write ~4 units of data for each unit of input, the suggested method gives ~2.5 units as the input grows without impacting the space-amp).

Hybrid Merge Tree

There may be provided a method, system and a non-transitory computer readable medium for building and using a hybrid merge tree.

There may be provided a method, a system and a non-transitory computer readable medium for performing storage related decisions based on a write cost.

Different write processes were compared to each other by their "write amplification" or else the number of bytes the system needs to write for every byte that the user writes.

The write amplification of the storage device is a multiplication of three parts: metadata overhead, the granularity of the storage interface and the physical write amplification that is due to the garbage collection process done on the media. For example when writing an object with size of 100 bytes, on low end SSD the write-amplification of write in place can reach 300, on the other hand when writing an object of 4K on a high end SSD the same calculation will lead to about 3.

The "write cost" includes the write amplification and also the relative cost of small random i/o as compared with large sequential i/o. In many devices the bandwidth of the write is highly dependent on the size of the I/O. The extreme case is rotational drive where writing a random 4K will end-up with 20 times less bandwidth than sequential writes.

When comparing B+Tree solutions that use random writes and LSM based techniques in terms of "write cost" in most scenarios the LSM is far better. For example on client grade SSD and with small object size the write amplification of B-Tree may be as large as 100 while with LSM it is at about 10. Alas, when doing an update of an existing large object on high end devices, where the write cost of a random small write is small, the picture does change and the B+tree solutions may be more effective.

The base value is the cost of writing a byte in a large sequence. This cost is calculated based on the actual maximum bandwidth the storage device can do with the given write size The write cost for random requests is a multiplication of three parts:

Cost of random writes per byte.

Logical write amplification: due to the fact that the interface to many of the devices is a block based (usually 4K) interface, when writing an object that is not aligned to the block size the system needs to write a full block. Therefore the write cost of writing an object is the ratio between the size in blocks of the write vs. the object size.

The physical write amplification. Many devices are using log write, all the writes are written in a sequence. Using log write requires garbage collection. The amount of writes that are due to the garbage collection process varies based on the amount of spares and free space that those devices have.

The overall cost of writing a byte is a multiplication of the three values. Hence, for example in rotation drives, where the cost per byte dropped dramatically when the size of the request is large, even relatively large objects gain significantly from using LSM.

The method performs divert from the traditional LSM and may perform in-place updates when applicable and beneficial.

There are mandatory terms that may be met before we consider in-place update:

The object exists.

The object original size is larger than the current size.

The old copy of the object is not part of any snapshot.

The file is not used for compaction.

The write can be done as an atomic operation.

The old copy of the object is not compressed.

No merge operator and no range delete that includes this object were performed after the object was written (in LSM "language" at a level above the location of the object).

If the system may use write in place for this object then the system compares the random write amplification of the target device and the average write amplification of the system and chooses the best method.

This idea is especially handy on memory based LSM where the cost of in place updates is practically the same as the cost of sequential updates. Using this method we can close the gap and provide in memory LSM with performance that exceeds b-tree like solutions in all the cases.

The system may also learn the pattern of the requests and save some spare space around an object in order to enable in-place updates for an object that has a size that is slightly larger than the previous size.

The system may also use the load on the disk and use write in place even in case it is less effective in terms of write-amplification/write cost if the disk is not heavily used. This would save future work of compaction.

FIG. 9 illustrates an example of method 200.

Method 200 may start by step 210 of receiving a request to apply an operation on a KVP, wherein the request is received before storing the KVP in a layer of a log-structured merge (LSM) tree. For example—the request is received during or before a flush from write buffer operation.

Step 210 may be followed by step 220 of determining whether to apply the operation in place or to apply the operation according to an LSM tree compaction scheme.

Applying the operation in place may involve a direct applying of the operation on the KVP instance in the LSM tree—for example using a byte access scheme—for example using persistent memory. The direct applying means that if the KVP instance in the LSM tree belong to a certain layer that is not the first layer—the operation may be applied without going through all the layers that lead to the certain layer.

Step 220 may be based on any of the examples mentioned above.

For example—determining to apply the operation in place when there is an KVP instance in the LSM tree, a snapshot was not taken between a point in time (PIT) of the request and a PIT of writing the KVP instance in the LSM tree, and a file that includes the KVP instance in the LSM tree is not currently undergoing compaction.

Step 220 may also include determining not to apply the operation in place when a size of the KVP exceeds a size allocated for storing of the KVP instance in the LSM tree.

Step 220 may also include determining not to apply the operation in place when the applying of the operation in place can not be executed in an atomic manner.

Step 220 may also include determining not to apply the operation in place when there was at least one operation of a merge operation and a range delete operation after a writing of the KVP instance in the LSM tree.

Step 220 may also include determining not to apply the operation in place when the KVP instance in the LSM tree is compressed.

When determining to apply the operation in place then step 220 is followed by step 230 of applying the operation in place.

When determining to apply the operation according to an LSM tree compaction scheme the step 220 is followed by step 240 of applying the operation according to the LSM tree compaction scheme.

Step 240 may include applying any LSM compaction scheme—full compaction or partial compaction—for example applying method 120.

The applying according to the LSM tree compaction scheme may include reaching the KVP instance in the LSM by progressing through the LSM tree layers.

Applying an operation that is a delete operation and/or a mathematical function may involve representing the request by a dedicated KVP (see for example dedicated KVP 151 in FIG. 8) that is indicative of the required operation. When the dedicated KVP reaches the KVP instance in the LSM—the merge operation includes applying the function.

The applying according to the LSM tree compaction scheme means that if the KVP instance in the LSM tree belong to a certain layer that is not the first layer—the operation may be applied only after progressing (by applying compaction operations) through all the layers that lead to the certain layer.

There may be provided a method for log-structured merge (LSM) tree compaction, method may include performing partial compaction processes; wherein each partial compaction process may be associated with a target layer; wherein different partial compaction processes that may be associated with a same target layer may be allocated to different non-overlapping key ranges of the target layer; and wherein some of the partial compaction processes may be associated with a target layer that may be a last layer of the LSM tree.

There may be provided a non-transitory computer readable medium for log-structured merge (LSM) tree compaction, non-transitory computer readable medium may stores instructions for performing partial compaction processes; wherein each partial compaction process may be associated with a target layer; wherein different partial compaction processes that may be associated with a same target layer may be allocated to different non-overlapping key ranges of the target layer; and wherein some of the partial compaction processes may be associated with a target layer that may be a last layer of the LSM tree.

The non-transitory computer readable medium may stores instructions for allocating first storage resources for storing a current version of the last layer, and allocating second storage resources for storing a compacted version of a currently compacted part of the last layer, wherein a size of the second storage resources does not exceed a size of the second storage resources.

The non-transitory computer readable medium may store instructions for dynamically changing the non-overlapping key ranges associated with one or more partial compaction process.

The non-transitory computer readable medium may store instructions for determining one or more parameters of a partial compaction process associated with a certain LSM layer independently from a determining of one or more parameters of a partial compaction process associated with another LSM layer.

There may be provided a log-structured merge (LSM) tree compaction system that may include a write buffer; a storage unit configured to store the LSM tree; and a controller that may be configured to perform partial compaction processes; wherein each partial compaction process may be associated with a target layer; wherein different partial compaction processes that may be associated with a same target layer may be allocated to different non-overlapping key ranges of the target layer; and wherein some of the partial compaction processes may be associated with a target layer that may be a last layer of the LSM tree.

The controller may be configured to allocate first storage resources for storing a current version of the last layer, and allocate second storage resources for storing a compacted version of a currently compacted part of the last layer, wherein a size of the second storage resources does not exceed a size of the second storage resources.

The controller may be configured to dynamically change the non-overlapping key ranges associated with one or more partial compaction process.

The controller may be configured to determine one or more parameters of a partial compaction process associated with a certain LSM layer independently from a determining of one or more parameters of a partial compaction process associated with another LSM layer.

The LSM tree may include multiple layers, wherein each layer that differs from the last layer may include a plurality of sorted runs.

The method may include dynamically creating and at least partially deleting the plurality of sorted runs per layer during the partial compaction processes.

A partial compaction process allocated to a certain key range may include merging source layer key value pairs (KVPs) of source layer files that exist at a start point in time of the partial compaction process.

Some of the source layer files belong to partially deleted sorted runs.

The LSM tree may include multiple layers, wherein an entire file of a source layer of the multiple layers may be subjected to up to a single partial compaction process to a target layer of the multiple layers.

The different non-overlapping key ranges of files of different source layers may be dictated by different non-overlapping key ranges of the last layer of the LSM tree.

Each file of each layer of the LSM tree stores keys that belong to a single key range of the last layer of the LSM tree.

Different partial compaction processes that may be associated with the same target layer and may be allocated to the different non-overlapping key ranges of the target layer may be executed in a serial manner.

The method may be executed without performing full compaction process of full layers.

The method may include allocating first storage resources for storing a current version of the last layer, and allocating second storage resources for storing a compacted version of a currently compacted part of the last layer, wherein a size of the second storage resources does not exceed a size of the second storage resources.

The size of the second storage resources may be less than fifty percent of the size of the first storage resources.

The size of the second storage resources may be less than a certain percent of the size of the first storage resources.

Any key range of any layer of the LSM tree does not exceed a certain percent of an aggregate key range of the last layer of the LSM tree.

The method may include dynamically changing the non-overlapping key ranges associated with one or more partial compaction process.

An execution of a partial compaction process may be preceded by determining one or more non-overlapping key ranges to be associated with the partial compaction process.

An execution of a partial compaction process may be preceded by determining one or more non-overlapping key ranges to be associated with the partial compaction process, wherein the determining of the one or more non-overlapping key ranges may be based on a write amplification associated with the execution of the partial compaction process.

An execution of a partial compaction process may be preceded by determining one or more non-overlapping key ranges to be associated with the partial compaction process, wherein the determining of the one or more non-overlapping key ranges may be based on (a) a write amplification associated with the execution of the partial compaction process, and (b) an impact on the last layer of the LSM tree.

An execution of a partial compaction process related to a target layer may be delayed until the source layer may include complete sorted runs, wherein a complete sorted run may include files that store keys from all key ranges of the last layer.

The method may include determining one or more parameters of a partial compaction process associated with a certain LSM layer independently from a determining of one or more parameters of a partial compaction process associated with another LSM layer.

There may be provided a method for applying an operation on a key value pair (KVP), the method may include receiving a request to apply an operation on a KVP, wherein the request is received before storing the KVP in a layer of a log-structured merge (LSM) tree; determining whether to apply the operation in place or to apply the operation according to an LSM tree compaction scheme; applying the operation in place when determining to apply the operation in place; and applying the operation according to an LSM tree compaction scheme when determining to apply the operation according to the LSM tree compaction scheme.

The operation is a delete operation or a read operation, or a mathematical operation or a write operation.

The method may include deciding to apply the operation in place when there is an KVP instance in the LSM tree, a snapshot was not taken between a point in time (PIT) of the request and a PIT of writing the KVP instance in the LSM tree, and a file that includes the KVP instance in the LSM tree is not currently undergoing compaction.

The method may include deciding not to apply the operation in place when a size of the KVP exceeds a size allocated for storing of the KVP instance in the LSM tree.

The method may include deciding not to apply the operation in place when the applying of the operation in place can not be executed in an atomic manner.

The method may include deciding not to apply the operation in place when there was at least one operation of a merge operation and a range delete operation after a writing of the KVP instance in the LSM tree.

The method may include deciding not to apply the operation in place when the KVP instance in the LSM tree is compressed.

The applying the operation according to an LSM tree compaction scheme may include performing partial compaction processes.

There may be provided a non-transitory computer readable medium for applying an operation on a key value pair (KVP), the non-transitory computer readable medium stores instructions for: receiving a request to apply an operation on a KVP, wherein the request is received before storing the KVP in a layer of a log-structured merge (LSM) tree; determining whether to apply the operation in place or to apply the operation according to an LSM tree compaction scheme; applying the operation in place when determining to apply the operation in place; and applying the operation according to an LSM tree compaction scheme when determining to apply the operation according to the LSM tree compaction scheme.

The non-transitory computer readable medium that may store instructions for deciding to apply the operation in place when there is an KVP instance in the LSM tree, a snapshot was not taken between a point in time (PIT) of the request and a PIT of writing the KVP instance in the LSM tree, and a file that includes the KVP instance in the LSM tree is not currently undergoing compaction.

The non-transitory computer readable medium that may store instructions for deciding not to apply the operation in place when a size of the KVP exceeds a size allocated for storing of the KVP instance in the LSM tree.

The non-transitory computer readable medium that may store instructions for deciding not to apply the operation in place when the applying of the operation in place can not be executed in an atomic manner.

The non-transitory computer readable medium that may store instructions for deciding not to apply the operation in place when there was at least one operation of a merge operation and a range delete operation after a writing of the KVP instance in the LSM tree.

The non-transitory computer readable medium that may store instructions for deciding not to apply the operation in place when the KVP instance in the LSM tree is compressed.

The non-transitory computer readable medium wherein the applying the operation according to an LSM tree compaction scheme may include performing partial compaction processes.

There may be provided a hybrid system that may include a write buffer; a storage unit configured to store a log-structured merge (LSM) tree; and a controller that is configured to: receive a request to apply an operation on a KVP, wherein the request is received before storing the KVP in a layer of a log-structured merge (LSM) tree; determine whether to apply the operation in place or to apply the operation according to an LSM tree compaction scheme; apply the operation in place when determining to apply the operation in place; and apply the operation according to an LSM tree compaction scheme when determining to apply the operation according to the LSM tree compaction scheme.

The operation may be a write operation, a read operation, a delete operation or a mathematical operation (for example, add, subtract, multiply, divide or any other function), or a read operation.

The controller may be configured to decide to apply the operation in place when there is an KVP instance in the LSM tree, a snapshot was not taken between a point in time (PIT) of the request and a PIT of writing the KVP instance in the LSM tree, and a file that includes the KVP instance in the LSM tree is not currently undergoing compaction.

The controller may be configured to decide not to apply the operation in place when a size of the KVP exceeds a size allocated for storing of the KVP instance in the LSM tree.

The controller may be configured to decide not to apply the operation in place when the applying of the operation in place can not be executed in an atomic manner. The controller may be configured to decide not to apply the operation in place when there was at least one operation of a merge operation and a range delete operation after a writing of the KVP instance in the LSM tree.

The controller may be configured to decide not to apply the operation in place when the KVP instance in the LSM tree is compressed.

The applying the operation according to an LSM tree compaction scheme may include performing partial compaction processes or full compaction process.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system and any other component should be applied mutatis mutandis to a method that may be executed by a system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Any combination of any module or unit listed in any of the figures, any part of the specification and/or any claims may be provided. Especially any combination of any claimed feature may be provided.

Any reference to the term "comprising" or "having" should be applied (mutatis mutandis) also as referring to "consisting" or "essentially consisting of".

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a computer program product such as a non-transitory computer readable medium. All or some of the computer program may be provided on non-transitory computer readable media permanently, removably or remotely coupled to an information processing system. The non-transitory computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc. A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system. The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations are merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments. Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

I claim:

1. A method for log-structured merge (LSM) tree compaction, method comprises:
    accessing a location within a memory storage that data associated with the LSM tree is stored, wherein the LSM tree includes a first layer and a second layer, wherein first layer includes a first sorted run and a second sorted run, and wherein the second layer includes a third sorted run,
    wherein the first sorted run is stored as a first file and a second file in the memory storage, wherein the second sorted run is stored as a third file and a fourth file in the memory storage, and wherein the third sorted run is stored as a fifth and sixth file in the memory storage,
    wherein the first file includes a first sorted list of keys and values, wherein the second file includes a second sorted list of keys and values, wherein the third file includes a third sorted list of keys and values, wherein the fourth file includes a fourth sorted list of keys and values, wherein the fifth file includes a fifth sorted list of keys and values, wherein the sixth file includes a sixth sorted list of keys and values,
    determining nonoverlapping key ranges associated with the partial compaction based on a write amplification associated with performing partial compaction of the LSM tree or an impact on a last layer of the LSM tree, wherein the determining nonoverlapping key ranges occurs prior to performing the partial compaction of the LSM tree;
    dynamically changing nonoverlapping key ranges associated with the fourth and fifth sorted runs;
    delaying a partial compaction process related to a target layer until a source layer includes complete sorted runs;
    performing a partial compaction on the LSM tree, wherein the partial compaction merges a range of data from one or more layers of the LSM together, wherein the partial compaction includes:
    merging the first file and the third file to create a seventh file;
    generating a fourth sorted run in the first layer that includes the seventh file and an eighth file;
    merging the first file and the third file with the fifth file to form an updated fifth file;
    deleting the first file to form a partially deleted first sorted;
    deleting the third file to form a partially deleted second sorted;
    merging the second file and the fourth file with the eighth file to create a tenth file;
    generating a fifth sorted run in the first layer that includes a ninth file and the tenth file;
    merging the second file and the fourth file with the sixth file to form an updated sixth file;
    deleting the second file; and
    deleting the third file.

2. The method according to claim 1, wherein the second layer is different from a last layer of the LSM tree.

3. The method according to claim 1, wherein the fourth and fifth sorted runs are created during performing of the partial compaction on the LSM tree.

4. The method according to claim 1, wherein the first file, the third file, and the fifth files are associated with a first range of nonoverlapping keys, and wherein the second file, the fourth file, and the sixth files are associated with a second range of nonoverlapping keys.

5. The method according to claim 4, wherein the seventh file is associated with the first range of nonoverlapping keys and wherein the eighth file is associated with the second range of nonoverlapping keys.

6. The method according to claim 4, wherein the ninth file is associated with the first range of nonoverlapping keys and includes data from the seventh file and wherein the tenth file is associated with the second range of nonoverlapping keys.

7. The method according to claim 1, wherein the eighth file is formed during the merging of the first file and the third file with the fifth file.

8. The method according to claim 1, wherein a range of key values associated with the fourth sorted run overlaps with the first sorted run.

9. The method according to claim 1, wherein a range of key values associated with the fourth sorted run overlaps with the second sorted run.

10. The method according to claim 1, wherein the partial compaction includes merging source layer key value pairs (KVPs) of source layer files present at an initiation of the partial compaction process.

11. The method according to claim 1 further comprising:
allocating a first storage resource for storing data associated with a last layer of the LSM tree; and
allocating a second storage resource for storing data associated with a compacted version of the last layer, wherein a size of the second storage resource is smaller than a size of the first storage resource.

12. A non-transitory computer readable medium that stores instructions for performing a method, the method comprising:
accessing a location within a memory storage that data associated with the LSM tree is stored, wherein the LSM tree includes a first layer and a second layer, wherein first layer includes a first sorted run and a second sorted run, and wherein the second layer includes a third sorted run,
wherein the first sorted run is stored as a first file and a second file in the memory storage, wherein the second sorted run is stored as a third file and a fourth file in the memory storage, and wherein the third sorted run is stored as a fifth and sixth file in the memory storage,
wherein the first file includes a first sorted list of keys and values, wherein the second file includes a second sorted list of keys and values, wherein the third file includes a third sorted list of keys and values, wherein the fourth file includes a fourth sorted list of keys and values, wherein the fifth file includes a fifth sorted list of keys and values, wherein the sixth file includes a sixth sorted list of keys and values,
determining nonoverlapping key ranges associated with the partial compaction based on a write amplification associated with performing partial compaction of the LSM tree or an impact on a last layer of the LSM tree, wherein the determining nonoverlapping key ranges occurs prior to performing the partial compaction of the LSM tree;
dynamically changing nonoverlapping key ranges associated with the fourth and fifth sorted runs;
delaying a partial compaction process related to a target layer until a source layer includes complete sorted runs;
performing a partial compaction on the LSM tree, wherein the partial compaction merges a range of data from one or more layers of the LSM together, wherein the partial compaction includes:
merging the first file and the third file to create a seventh file;
generating a fourth sorted run in the first layer that includes the seventh file and an eighth file;
merging the first file and the third file with the fifth file to form an updated fifth file;
deleting the first file to form a partially deleted first sorted;
deleting the third file to form a partially deleted second sorted;
merging the second file and the fourth file with the eighth file to create a tenth file;
generating a fifth sorted run in the first layer that includes a ninth file and the tenth file;
merging the second file and the fourth file with the sixth file to form an updated sixth file;
deleting the second file; and
deleting the third file.

13. The non-transitory computer readable medium of claim 12, wherein the first file, the third file, and the fifth files are associated with a first range of nonoverlapping keys, and wherein the second file, the fourth file, and the sixth files are associated with a second range of nonoverlapping keys.

14. The non-transitory computer readable medium of claim 13, wherein the seventh file is associated with the first range of nonoverlapping keys and wherein the eighth file is associated with the second range of nonoverlapping keys.

15. The non-transitory computer readable medium of claim 13, wherein the ninth file is associated with the first range of nonoverlapping keys and includes data from the seventh file and wherein the tenth file is associated with the second range of nonoverlapping keys.

16. A log-structured merge (LSM) tree compaction system that comprises:
one or more memory;
a write buffer;
a storage unit configured to store the LSM tree; and
a controller that is configured to:
access a location within the storage unit that data associated with the LSM tree is stored, wherein the LSM tree includes a first layer and a second layer, wherein first layer includes a first sorted run and a second sorted run, and wherein the second layer includes a third sorted run,
wherein the first sorted run is stored as a first file and a second file in the storage unit, wherein the second sorted run is stored as a third file and a fourth file in the storage unit, and wherein the third sorted run is stored as a fifth and sixth file in the storage unit,
wherein the first file includes a first sorted list of keys and values, wherein the second file includes a second sorted list of keys and values, wherein the third file includes a third sorted list of keys and values, wherein the fourth file includes a fourth sorted list of keys and values, wherein the fifth file includes a fifth sorted list of keys and values, wherein the sixth file includes a sixth sorted list of keys and values,
determine nonoverlapping key ranges associated with the partial compaction based on a write amplification associated with performing partial compaction of the LSM tree or an impact on a last layer of the LSM tree, wherein the determining nonoverlapping key ranges occurs prior to performing the partial compaction of the LSM tree;
dynamically change nonoverlapping key ranges associated with the fourth and fifth sorted runs;
delay a partial compaction process related to a target layer until a source layer includes complete sorted runs;
perform a partial compaction on the LSM tree, wherein the partial compaction merges a range of data from one or more layers of the LSM together, wherein the partial compaction includes:
merge the first file and the third file to create a seventh file;
generate a fourth sorted run in the first layer that includes the seventh file and an eighth file;
merge the first file and the third file with the fifth file to form an updated fifth file;
delete the first file to form a partially deleted first sorted;
delete the third file to form a partially deleted second sorted;
merge the second file and the fourth file with the eighth file to create a tenth file;
generate a fifth sorted run in the first layer that includes a ninth file and the tenth file;
merge the second file and the fourth file with the sixth file to form an updated sixth file;
delete the second file; and
delete the third file.

17. The log-structured merge (LSM) tree compaction system of claim 16, wherein the first file, the third file, and the fifth files are associated with a first range of nonoverlapping keys, and wherein the second file, the fourth file, and the sixth files are associated with a second range of nonoverlapping keys.

18. The log-structured merge (LSM) tree compaction system of claim 17, wherein the seventh file is associated with the first range of nonoverlapping keys and wherein the eighth file is associated with the second range of nonoverlapping keys.

19. The log-structured merge (LSM) tree compaction system of claim 17, wherein the ninth file is associated with the first range of nonoverlapping keys and includes data from the seventh file and wherein the tenth file is associated with the second range of nonoverlapping keys.

* * * * *